United States Patent [19]
Farnham et al.

[11] 4,096,202
[45] Jun. 20, 1978

[54] IMPACT MODIFIED POLY(ALKYLENE TEREPHTHALATES)

[75] Inventors: Sutton B. Farnham, Levittown; Theodore D. Goldman, Cornwell Heights, both of Pa.

[73] Assignee: Rohm and Haas Company, Philadelphia, Pa.

[21] Appl. No.: 694,509

[22] Filed: Jun. 9, 1976

[51] Int. Cl.² .............. C08L 67/06; C08G 39/10
[52] U.S. Cl. .................. 260/873; 260/40 R; 260/876 R
[58] Field of Search ........... 260/836, 835, 837, 873, 260/876 R

[56] References Cited

U.S. PATENT DOCUMENTS

| | | | |
|---|---|---|---|
| 3,649,337 | 3/1972 | Johnson | 428/413 |
| 3,652,722 | 3/1972 | Dickie | 260/835 |
| 3,660,371 | 5/1972 | Johnson | 428/417 |
| 3,699,185 | 10/1972 | Dickie | 260/836 |
| 3,701,679 | 10/1972 | Johnson | 117/93.31 |
| 3,719,523 | 3/1973 | Johnson | 428/147 |
| 3,745,196 | 7/1973 | Lane | 260/881 |
| 3,787,522 | 1/1974 | Dickie | 260/836 |
| 3,833,683 | 9/1974 | Dickie | 260/836 |
| 4,022,748 | 5/1977 | Schlichting et al. | 260/40 R |
| 4,034,013 | 7/1977 | Lane | 260/835 |

Primary Examiner—Thomas De Benedictis
Attorney, Agent, or Firm—Michael B. Fein

[57] ABSTRACT

Compositions comprising a blend of poly(alkylene terephthalates) and an impact modifier which is a multiphase composite interpolymer comprising a crosslinked acrylic first stage which also contains graftlinking monomer and a final rigid thermoplastic phase. Also claimed is the process for improving the impact strength of poly(alkylene terephthalates) comprising blending therewith the multi-phase composite interpolymer modifier defined above.

9 Claims, No Drawings

IMPACT MODIFIED POLY(ALKYLENE TEREPHTHALATES)

BACKGROUND OF THE INVENTION

1. Field of the Invention

This invention relates to impact modification of poly(alkylene terephthalates).

2. Description of the Prior Art

Although impact modifiers for poly(alkylene terephthalates) based on rubbers of polybutadiene, butadiene-styrene copolymers, butadiene-acrylonitrile copolymers, ethylene-propylene rubbers, polyisobutene and polyisoprene have been suggested, no one has suggested impact modifiers based on acrylic rubbers which are multi-phase composite interpolymers. See, for example, U.S. Pat. No. 3,919,353. Although such acrylic rubber-based composite interpolymers have been suggested as impact modifiers for thermoplastic polymers in general, they have especially been suggested for vinyl halide polymers and acrylic polymers.* It was unexpected that such impact modifiers should also function well to modify poly(alkylene terephthalates) because acrylic polymers and vinyl halide polymers are both considered amorphous plastics whereas poly(alkylene terephthalates), especially poly(butylene terephthalate), are generally considered to be a crystalline plastics. It would be considered unexpected to those skilled in the art that the modifiers and techniques used to obtain enhancement of specific properties in one plastic can be extended to the other plastic.

* See Owens U.S. Pat. No. 3,808,180

Combination impact modifier melt strength improvers based on multiple stage polymers having an epoxy functional final stage have been disclosed by Lane, Ser. No. 631,761 filed Nov. 13, 1975 now U.S. Pat. No. 4034013. Lane's materials operate by significantly increasing melt viscosity. However it is frequently desired by processors of poly(alkylene terephthalates), especially in injection molding of PBT, to achieve impact modification without significantly increasing melt viscosity.

SUMMARY OF THE INVENTION

It is therefore an object of the invention to provide an impact modified poly(alkylene terephthalate). Another object of the invention is to provide a process for improving impact strength of poly(alkylene terephthalate) without significantly increasing melt viscosity. These objects and others as will become apparent from the following disclosure are achieved by the present invention which comprises a blend of about 99 to 60 percent by weight of a poly(alkylene terephthalate) and about 1 to 40 percent by weight of a multi-phase composite interpolymer comprising about 25 to 95 weight percent of a first elastomeric phase polymerized from a monomer system comprising about 75 to 99.8 percent by weight of a ($C_1$ to $C_6$) alkyl acrylate, 0.1 to 5 percent by weight cross-linking monomer, and 0.1 to 5 percent by weight graftlinking monomer, and about 75 to 5 weight percent of a final, rigid thermoplastic phase free of epoxy groups polymerized in the presence of said elastomeric phase.

DETAILED DESCRIPTION OF THE INVENTION AND THE PREFERRED EMBODIMENTS

The poly($C_1$ to $C_6$ alkylene terephthalates) which are modified in accordance with this invention can be poly (methylene terephthalate), poly(ethylene terephthalate), poly (propylene terephthalate), poly(butylene terephthalate), poly(pentylene terephthalate), poly(cyclohexene terephthalate), and the like. Poly(butylene terephthalate) is especially suitable to impact modification in accordance with this invention. Suitable amounts of impact modifier are from 1 to 40 percent by weight of the blend. Below 1 percent, no significant effect is seen, and it is preferred to have at least 10 percent by weight of the impact modifier for significant improvement. Above 40 percent by weight, no further improvement is economically achieved. The impact modifier is a multi-phase composite interpolymer comprising about 25 to 95 weight percent of a first elastomeric phase and about 75 to 5 weight percent of a final rigid thermoplastic phase. One or more intermediate phases are optional, for example a middle stage polymerized from about 75 to 100 percent by weight styrene. The first stage is polymerized from about 75 to 99.8 weight percent $C_1$ to $C_6$ acrylate resulting in an acrylic rubber core having a $T_g$ below about 10° C. and crosslinked with 0.1 to 5 weight percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate. The impact modifiers of the present invention do not function as melt viscosity increasers as do the modifiers described in U.S. patent application Ser. No. 631,761 filed Nov. 13, 1975 now U.S. Pat. No. 4034013, since they do not contain a reactive outer stage; more particularly they do not contain reactive epoxide units in the outer stage.

The final stage monomer system can be comprised of $C_1$ to $C_{16}$ methacrylate, styrene, acrylonitrile, alkyl acrylates, allyl methacrylate, diallyl methacrylate, and the like, as long as the over $T_g$ is at least 20° C. Preferably the final stage monomer system is at least 50 weight percent $C_1$ to $C_4$ alkyl methacrylate. It is further preferred that the final stage polymer be free of units which tend to degrade poly(alkylene terephthalates), for example acid, hydroxyl amino, and amide groups.

EXAMPLES

In the following Examples, the abbreviations in accordance with the following Table are used:

BA = n-butyl acrylate
EA = ethyl acrylate
EHA = 2-ethylhexyl acrylate
BDA = 1,3-butylene diacrylate
AlMA = allyl methacrylate
St = styrene
MMA = methyl methacrylate
LMA = lauryl methacrylate
AN = acrylonitrile
DALM = diallyl maleate
PBT = poly(butylene terephthalate)
BD = butadiene
AA = acrylic acid
DMAEMA = dimethylaminoethyl methacrylate
AAM = acrylamide
HEMA = 2-hydroxyethyl methacrylate
PET = poly(ethylene terephthalate)

A single slash is used between monomers of a single stage and a double slash is used as a shorthand method of indicating a separation between stages or phases. The first stage to be polymerized is written first before the double slash, and subsequent stages are written subsequently.

EXAMPLES 1 to 25

Using conventional emulsion polymerization, multiple stage impact modifiers according to the invention of the following formulations are prepared:

| Example NO. | COMPOSITION | MONOMER WEIGHT RATIOS |
|---|---|---|
| 1 | BA/BDA/AlMA//MMA/AlMA | 69.45/.35/.28//19.95/9.97 |
| 2 | BA/BDA/DALM//MMA/AlMA | 69.45/.35/.28//19.95/9.97 |
| 3 | BA/BDA/AlMA//MMA/AlMA | 79.29/.4/.32//9.99/9.99 |
| 4 | BA/BDA/AlMA//AlMA | 89.19/.45/.36//10.00 |
| 5 | BA/BDA/AlMA//MMA/AlMA | 69.45/.35/.28//9.97/19.95 |
| 6 | BA/BDA/AlMA/MMA/DALM | 69.45/.35/.28//19.95/9.97 |
| 7 | BA/BDA/AlMA//MMA/AlMA/EA | 69.45/.35/.28//17.95/9.97/2.00 |
| 8 | BA/BDA/AlMA//MMA/AlMA | 69.45/.35/.28//19.95/9.97 |
| 9 | BA/BDA/AlMA//St//MMA/EA | 59.48/.30/.24//18//19.8/2.2 |
| 10 | BA/BDA/AlMA//St/MMA/EA | 59.48/.3/.24//17.99/19.79/2.2 |
| 11 | BA/BDA/AlMA//MMA/EA | 59.48/.3/.24//35.99/4 |
| 12 | BA/BDA/AlMA//MMA/EA | 72.61/.37/.29//24.03/2.7 |
| 13 | BD/St//St//MMA/EA | 47/13//18//19.8/2.2 |
| 14 | BA/BDA/DALM//MMA | 69.3/.35/.35//30 |
| 15 | EA/BDA/AlMA//St//MMA/EA | 59.47/.3/.24//18.00//19.80/2.19 |
| 16 | BA/BDA/AlMA//St//MMA/EA | 59.5/.3/.24//18//19.8/2.2 |
| 17 | EHA/BDA/AlMA//St//MMA/EA | 59.49/.3/.24//18.00//19.81/2.15 |
| 18 | BA/BDA/AlMA//MMA/LMA | 69.36/.35/.28//20/10 |
| 19 | BA/BDA/AlMA//AN/MMA | 69.34/.35/.28//7.5/22.5 |
| 20 | BA/BDA/AlMA//AN/St | 69.34/.35/.28//7.5/22.5 |
| 21 | BA/BDA/AlMA//AlMA//MMA/EA | 69.45/.35/.28//9.97//17.95/2.00 |
| 22 | BA/BDA/AlMA//MMA/AA | 69.37/.35/.28//25/5 |
| 23 | BA/BDA/AlMA//MMA/HEMA | 69.37/.35/.28//20/10 |
| 24 | BA/BDA/AlMA//MMA/DMAEMA | 69.37/.35/.28//26.5/3.5 |
| 25 | BA/BDA/AlMA//MMA/AAM | 69.37/.35/.28//26.5/3.5 |
| 26 | BA/BDA/DALM//MMA | 79.2/.4/.4//20 |
| 27 | BA/BDA/AlMA//MMA/EA | 79.28/.4/.32//18/2 |
| 28 | BA/BDA/AlMA//MMA/EA | 81.26/.41/.33//16.2//1.8 |
| 29 | BA/BDA/AlMA//MMA/EA | 84.23/.43/.34//13.5/1.5 |
| 30 | BA/BDA/AlMA//MMA/EA | 87.21/.45/.34//10.8/1.2 |

EXAMPLES 26 through 42

Blends of modifiers and resins were extrusion compounded using a 1 inch diameter, 24:1 L/D machine with a 2 stage 3.0/3.5:1 screw. Extrusion temperatures were 450°–525° F. Dried extruded pellets were molded using a 1.5 oz. reciprocating screw injection molder with an ASTM family mold. Processing temperatures were again 450°–525° F. with a mold temperature of ca. 150° F. and a 30–45 sec. cycle time. Impact strengths were determined by ASTM D-256 using ⅛ inch thick milled notched injection molded bars.

In all of the following examples, poly(butylene terephthalate) (Eastman Chemical Products Tenite 6PRO brand) was first used alone and then under the same conditions with specified percentages of the modifiers prepared in accordance with prior examples.

| Ex. NO. | MODIFIER | NOTCHED IZOD IMPACT (ft.-lbs./in.,1/8" Bars) |
|---|---|---|
| 31 | None | 0.62 ± 0.07 |
|  | 10% Example 1 | 1.35 ± 0.23 |
| 32 | None | 0.68 ± 0.09 |
|  | 10% Example 2 | 0.93 ± 0.10 |
| 33 | None | 0.62 ± 0.07 |
|  | 10% Example 3 | 1.25 ± 0.13 |
|  | 10% Example 4 | 1.02 ± 0.10 |
| 34 | None | 0.75 ± 0.06 |

-continued

| Ex. NO. | MODIFIER | NOTCHED IZOD IMPACT (ft.-lbs./in.,1/8" Bars) |
|---|---|---|
|  | 10% Example 5 | 0.88 ± 0.13 |
|  | 10% Example 6 | 1.01 ± 0.11 |
|  | 10% Example 7 | 1.29 ± 0.18 |
| 35 | None | 0.65 ± 0.16 |
|  | 10% Example 8 | 1.39 ± 0.23 |
| 36 | None | 0.91 ± 0.1 |
|  | 10% Example 9 | 2.01 ± 0.27 |
|  | 10% Example 10 | 2.22 ± 0.15 |
|  | 10% Example 11 | 3.30 ± 0.09 |
|  | 10% Example 12 | 2.73 ± 0.13 |
|  | 10% Example 13 | 1.97 ± 0.18 |
| 37 | None | 1.01 ± 0.12 |
|  | 10% Example 14 | 1.74 ± 0.17 |
| 38 | None | 0.98 ± 0.16 |
|  | 10% Example 15 | 1.30 ± 0.0 |
|  | 10% Example 16 | 1.59 ± 0.1 |
|  | 10% Example 17 | 1.39 ± 0.30 |
| 39 | None | 0.87 ± 0.12 |
|  | 10% Example 18 | 1.84 ± 0.15 |
|  | 10% Example 19 | 2.07 ± 0.14 |
|  | 10% Example 20 | 2.17 ± 0.14 |
|  | 10% Example 21 | 1.65 ± 0.04 |
| 40 | None | 1.01 ± 0.12 |
|  | 10% Example 22 | 1.24 ± 0.13 |
|  | 10% Example 23 | 1.13 ± 0.17 |
|  | 10% Example 24 | 0.91 ± 0.11 |
|  | 10% Example 25 | 0.86 ± 0.25 |
| 41 | None | 0.75 ± 0.15 |
|  | 10% Example 26 | 3.09 ± 0.22 |
|  | 15% Example 26 | 13.40 ± 1.12 |
|  | 20% Example 26 | 17.79 ± 0.35 |
|  | 10% Example 27 | 3.31 ± 0.42 |
|  | 15% Example 27 | 11.71 ± 0.81 |
|  | 20% Example 27 | 14.00 ± 0.51 |
| 42 | None | 1.08 ± 0.08 |
|  | 10% Example 28 | 3.10 ± 0.12 |
|  | 20% Example 28 | 17.97 ± 0.75 |
|  | 10% Example 29 | 3.63 ± 0.26 |
|  | 20% Example 29 | 20.38 ± 0.45 |
|  | 10% Example 30 | 15.23 ± 0.51 |
|  | 20% Example 30 | 20.43 ± 0.60 |

EXAMPLE 43

The impact modifier of Example 1 also functions very well to improve poly(propylene terephthalate) and poly(cyclohexane terephthalate), improving the notched Izod impact strength thereof.

EXAMPLE 44

To show the beneficial effect of the invention when the poly(alkylene terephthalate) is PET, the procedure used in Example 26-42 was used except AKZO Arnite A-160 PET, I.V. = 1.0, was used instead of PBT, and mold temperature was 130°-150° F. with 40 sec. cycle time using a ram injection molder instead of a reciprocating screw type.

In amorphous form, i.e., when a cold mold is used, 10% of the modifier of Example 26 increased the notched Izod impact strength from 0.24 ± 0.07 to 1.02 ± 0.13. In crystalline form, i.e., when the molded part is post-headed for 30 mins. at 140° C., the notched Izod of the unmodified was 0.33 ± 0.12 while the 10% Example 26 molding had a notched Izod of 0.79 ± 0.09.

EXAMPLE 45

To show the improved thermal stability of modifiers used in the invention versus butadiene based analogues, thermal gravometric analysis (TGA) and differential scanning colorimetry (DSC) were done on both the Example 13 and the Example 16 modifiers. The TGA results are reported in the following Table:

TABLE

| TGA,20° C./Min.-argon atm. | % Weight Loss | |
|---|---|---|
| Temp. ° C. | Example 13 | Example 16 |
| 200 | 1.1 | 0.3 |
| 250 | 1.7 | 0.7 |
| 270 | 1.8 | 1.2 |

The DSC results (run at 20° C./min.) were that the Example 13 modifier shows a strong exotherm at 200° C., whereas the Example 16 modifier did not begin to exotherm until 235° C. Further, the Example 13 material charred at 235° C. whereas Example 16 did not char even at 325° C.

These data show that modifiers used in the invention are far more thermally stable at typical PBT processing temperatures than butadiene-based analogues.

We claim:

1. A composition comprising a blend of about 99 to 60% by weight of a poly($C_1$-$C_6$ alkylene terephthalate) and about 1 to 40% by weight of a multi-phase composite interpolymer comprising:
   (A) about 25 to 95 weight percent of a first elastomeric phase polymerized from a monomer system comprising about 75 to 99.8% by weight $C_1$ to $C_6$ alkyl acrylate, 0.1 to 5% by weight crosslinking member, 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and,
   (B) about 75 to 5 weight percent of a final, rigid thermoplastic phase polymerized in the presence of said elastomeric phase and is free of epoxy groups.

2. The composition of claim 1 wherein said graftlinking monomer is allyl methacrylate or diallyl maleate.

3. The composition of claim 1 wherein the crosslinking monomer is butylene diacrylate.

4. The composition of claim 1 wherein the poly($C_1$ to $C_5$ alkyl terephthalate) is poly(butylene terephthalate).

5. The composition of claim 1 wherein said final rigid thermoplastic phase is polymerized from a monomer system comprising about 50 to 100 weight percent of a $C_1$ to $C_4$ alkyl methacrylate.

6. The composition of claim 1 wherein said final phase monomer system is free of acid, hydroxyl, amino, and amide groups.

7. The composition of claim 1 wherein the multiphase composite interpolymer includes an intermediate phase polymerized from a monomer system comprising from 75 to 100% by weight styrene.

8. The composition of claim 1 wherein the poly($C_1$ to $C_6$ alkylene terephthalate) is poly(butylene terephthalate), the interpolymer has only two stages, the first stage comprising about 60 to 95% by weight of said interpolymer and said first stage is polymerized from a monomer system comprising 95 to 99.8% by weight butyl acrylate, 0.1 to 2.5% by weight butylene diacrylate as a crosslinking agent, 0.1 to 2.5% by weight allyl methacrylate or diallyl maleate as a graftlinking agent, and said final stage is polymerized from about 60 to 100% by weight methyl methacrylate.

9. A process for improving the impact strength of poly($C_1$ to $C_6$ alkylene terephthalate) comprising blending therewith about 1 to 40% by weight of the multiphase composite interpolymer defined in claim 1.

* * * * *

REEXAMINATION CERTIFICATE (113th)

United States Patent [19]
Farnham et al.

[11] B1 4,096,202
[45] Certificate Issued Aug. 9, 1983

[54] IMPACT MODIFIED POLY(ALKYLENE TEREPHTHALATES)

[75] Inventors: Sutton B. Farnham, Levittown; Theodore D. Goldman, Cornwell Heights, both of Pa.

[73] Assignee: Rohm and Haas Company, Philadelphia, Pa.

Reexamination Request
No. 90/000,241, Aug. 11, 1982

Reexamination Certificate for:
Patent No.: 4,096,202
Issued: Jun. 20, 1978
Appl. No.: 694,509
Filed: Jun. 9, 1976

[51] Int. Cl.³ .................................... C08L 67/06
[52] U.S. Cl. .................................... 525/64; 523/201
[58] Field of Search .......................... (none).

[56] References Cited

U.S. PATENT DOCUMENTS

| | | | |
|---|---|---|---|
| 3,649,337 | 3/1972 | Johnson | 428/413 |
| 3,652,722 | 3/1972 | Dickie | 260/835 |
| 3,660,371 | 5/1972 | Johnson | 428/417 |
| 3,699,185 | 10/1972 | Dickie | 260/836 |
| 3,701,679 | 10/1972 | Johnson | 117/93.31 |
| 3,719,523 | 3/1973 | Johnson | 428/147 |
| 3,745,196 | 7/1973 | Lane | 260/881 |
| 3,787,522 | 1/1974 | Dickie | 260/836 |
| 3,808,180 | 4/1974 | Owens | 260/885 |
| 3,833,683 | 9/1974 | Dickie | 260/836 |
| 3,919,353 | 11/1975 | Castelnuovo et al. | 260/873 |
| 4,022,748 | 5/1977 | Schlichting et al. | 260/40 R |
| 4,034,013 | 7/1977 | Lane | 260/835 |

FOREIGN PATENT DOCUMENTS

| | | |
|---|---|---|
| 48-8343 | 3/1973 | Japan. |
| 49-97081 | 9/1974 | Japan. |
| 50-23449 | 3/1975 | Japan. |
| 1208585 | 10/1970 | United Kingdom. |

OTHER PUBLICATIONS

H. A. Lanceley et al, COMPOSITE MATERIALS, Leslie Holliday, Editor, Elsevier Publishing Co, 1966, pp. 221-289.

*Primary Examiner*—M. I. Marquis

[57] ABSTRACT

Compositions comprising a blend of poly(alkylene terephthalates) and an impact modifier which is a multiphase composite interpolymer comprising a crosslinked acrylic first stage which also contains graftlinking monomer and a final rigid thermoplastic phase. Also claimed is the process for improving the impact strength of poly(alkylene terephthalates) comprising blending therewith the multi-phase composite interpolymer modifier defined above.

REEXAMINATION CERTIFICATE ISSSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–9 is confirmed.

* * * * *